(12) United States Patent
Feng

(10) Patent No.: US 7,434,274 B2
(45) Date of Patent: *Oct. 14, 2008

(54) PANORAMIC-VIEW DIVING MASK WITH SELF-SEALING, NON-GLUED REMOVABLE AND INTEGRALLY FORMED LENSES

(76) Inventor: Li-Jen Feng, 1928 Tyler Ave., Suite H, El Monte, CA (US) 91733

( * ) Notice: Subject to any disclaimer, the term of this patent is extended or adjusted under 35 U.S.C. 154(b) by 54 days.

This patent is subject to a terminal disclaimer.

(21) Appl. No.: 11/190,175

(22) Filed: Jul. 26, 2005

(65) Prior Publication Data

US 2007/0070290 A1 Mar. 29, 2007

Related U.S. Application Data

(63) Continuation-in-part of application No. 10/867,065, filed on Jun. 12, 2004, now Pat. No. 6,921,165.

(51) Int. Cl.
*A61F 9/02* (2006.01)
(52) U.S. Cl. ............................................. 2/428; 351/43
(58) Field of Classification Search ................... 2/428, 2/430, 448, 452, 450; 24/199; 351/41, 43
See application file for complete search history.

(56) References Cited

U.S. PATENT DOCUMENTS 6,341,863 B1 * 1/2002 Chen-Lieh .................... 351/43
6,921,165 B1 * 7/2005 Feng .............................. 351/43
7,125,115 B2 * 10/2006 Feng .............................. 351/43

\* cited by examiner

*Primary Examiner*—Katherine Moran
(74) *Attorney, Agent, or Firm*—Trojan Law Office

(57) ABSTRACT

A panoramic-view diving mask with self-sealing, non-glued, removable front lenses and side lenses integrally formed in the frame body of the mask. The lenses are self-sealed by an assembly process in which a layer of elastic gasket medium is applied or attached to either one or both beveled contacting edges of the frontal and side lenses, respectively. The lenses are assembled by pressing an assembly ring against the frontal lens and side lens, forcing compression against the elastic gasket medium at the contacting edges of the two lenses and securing the front lenses to the side lenses that are integrally formed with the frame body of the mask. The result is a watertight seal, achieved without adhesives, at the contacting edges of the front and side lenses. This process reduces storage space, packaging size and transporting costs during mass production. Also, this non-glued and removable self-sealing lens assembly allows individuals to easily replace a front lens that is broken, scratched or corrected for near or far-sighted vision.

7 Claims, 8 Drawing Sheets

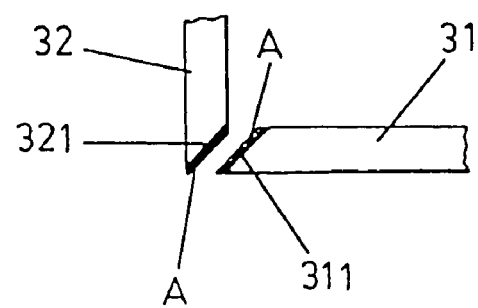
FIG. 3~A
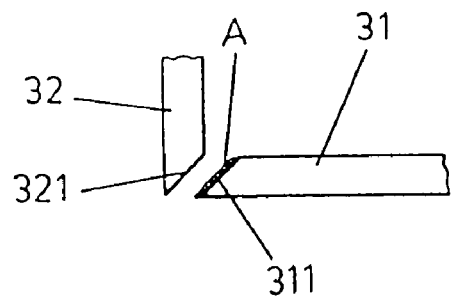
FIG. 3~B
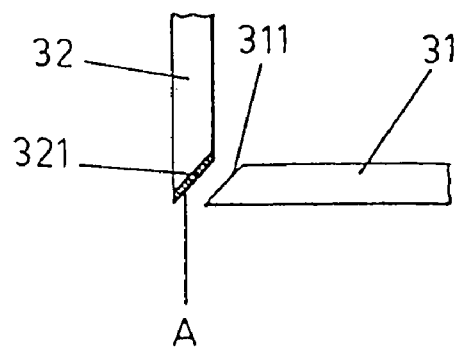
FIG. 3~C

PANORAMIC-VIEW DIVING MASK WITH SELF-SEALING, NON-GLUED REMOVABLE AND INTEGRALLY FORMED LENSES

CLAIM OF PRIORITY

This application is a Continuation in Part of application of Ser. No. 10/867,065, filed Jun. 12, 2004, now U.S. Pat. No. 6,921,165.

BACKGROUND OF THE INVENTION

1. Field of the Invention

This invention improves the assembly process for a panoramic-view diving mask, enabling easier replacement of a broken or scratched lens or optical-correction lens.

2. Description of the Prior Art

A diver's mask may include one or more lenses. More recently lenses on each side of the single- or double-frontal-lens mask have been incorporated to enhance the diver's peripheral vision, thus creating a panoramic viewing of the surrounding environment. In the prior art, to achieve this viewing advantage, manufacturers have typically used a permanent adhesive to bond the side and frontal lenses together to form a watertight seal at the lens joint. Though conventional panoramic-view diving masks are popular in the market, gluing the lenses together entails some distinct disadvantages for manufacturers and consumers (or end users).

For the end user, the replacement of a broken or scratched lens, or the change of a prescribed optical-correction lens, cannot be done without causing permanent damage to the bonded edges of the assembled lenses, perhaps even rendering the mask non-water-tight. For the manufacturer, high costs are associated with the pre-bonding of the front and side lenses to create three-dimensional lens configurations (usually as L or U configurations) necessary before the lenses can be assembled to the mask frame.

In an improvement on conventional panoramic-view diving mask having pre-bonded lens assembly, a new method of lens assembly was developed using self-sealing, non-glued removable watertight lenses that could enable the manufacturer and the end user to easily replace damaged lenses. In this type of improved diving mask, both the front and side lenses are removable. Having removable front and side lenses allow for easy replacement of damaged lenses.

However, it is not always necessary or desirable to have both the front and side lenses be removable. In actual use it is often only the front lenses that are susceptible to being damaged because the front lenses are large and are most exposed by their forward orientation. The side lenses are less susceptible to damage and, thus, do not often require replacement.

Fore the foregoing reasons, there is a need for a panoramic-view diving mask with seal-sealing, non-glued removable front lenses and side lenses integrally formed with the frame body of the mask.

SUMMARY OF THE INVENTION

This novel panoramic-view diving mask provides a non-glued, completely watertight and removable self-sealing lens assembly (with at least one frontal lens and at least one side lens) in which a layer of elastic medium is attached, or applied, to either one or both surfaces of the contacting edges of the frontal and side lens simultaneously, creating compression against the elastic gasket medium and securing the frontal and side lenses to the mask frame for a watertight seal within the mask without the application of an adhesive to connect the front and side lenses together at the lens contacting edges. With this non-glued, yet watertight and removable self-sealing lens assembly, individual users can easily replace a lens that is broken, scratched, or corrected for near-or far-sighted vision. This improved lens assembly process results in reduced storage space, reduced packaging sizes and reduced costs of transporting of the assembled lenses during mass production.

More particularly, the present invention is directed to a panoramic-view diving mask with self-sealing, non-glued removable front lenses and side lenses integrally formed as part of the frame body of the mask. In a conventional panoramic-view diving mask with removable lenses, both the front and side lenses are removable. The lenses have corresponding contacting edges, with the contacting edge of the frontal lens beveled to mate with a corresponding beveled edge on the side lens. The lenses are self-sealed by an assembly process in which a layer of elastic gasket medium is applied or attached to either one or both of the beveled contacting edges. When the lenses are assembled by pressing an assembly ring against the frontal lens and side lens simultaneously, forcing compression against the elastic gasket medium at the contacting edges, a water-tight seal is formed at the contacting edges between the lenses.

However, it is not always necessary or desirable to have both the front and side lenses be removable. In actual use it is often only the front lenses that are susceptible to being damaged because the front lenses are large and are most exposed by their forward orientation. The side lenses are less susceptible to damage and, thus, do not often require replacement.

The claimed invention improves over the prior art by incorporating side lenses that are integrally formed with the frame body. Whereas in a conventional diving mask with self-sealing, non-glued removable lens, the side lenses are removable, in the present invention the side lenses are integrally formed with the frame body itself. The frame body further comprises a subframe and a mainframe, wherein the subframe fits into the mainframe. The side lenses are integrally formed with the subframe. For example, the side lenses can be formed integrally with the frame body by being molded as part of the subframe or by being permanently bonded to the subframe by adhesive.

In having the side lenses formed integrally with the frame body, manufacturing efficiency is improved by eliminating the need to make the side lenses separately. This also simplifies the process of lens assembly by requiring only the front lenses to be assembled (typically the lenses that most often need to be replaced), without sacrificing the viewing panorama and still allowing for easy replacement of the front lenses. Because it is often unnecessary to replace the side lenses, the side lenses can be formed integrally with the frame body.

To enable further understanding of the stated objectives and the technological methods of the invention herein, a brief description of the drawings below is followed by a detailed description of the preferred embodiments as set forth below.

BRIEF DESCRIPTION OF THE DRAWING

FIG. 3A shows a perspective view of the assembly of the frontal lens to the side lens having a lens contact medium applied to the both surfaces of the contacting edges of the lenses, thereby forming a self-sealing and removable lens assembly.

FIG. 3B shows a perspective view of the assembly of the frontal lens to the side lens having a lens contact medium applied to only one contacting edge (the frontal lens), thereby forming a self-sealing and removable lens assembly.

FIG. 3C shows a perspective view of the assembly of the frontal lens to the side lens having a lens contact medium applied only to the contacting edge of the side lens, thereby forming a self-sealing and removable lens assembly.

DETAILED DESCRIPTION OF THE DRAWINGS AND THE PREFFERED EMBODIMENTS

Figure 1:
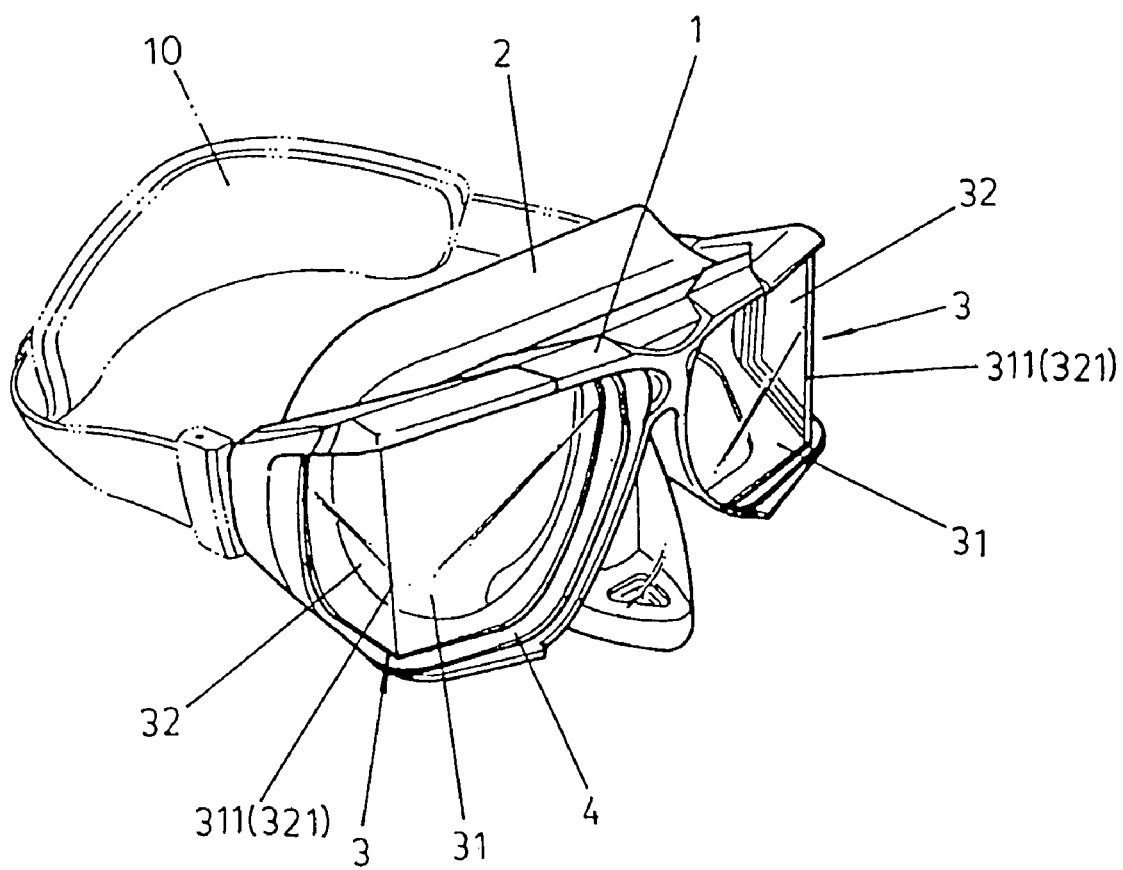
FIG. 1 shows a perspective view of the present invention.
Figure 2:
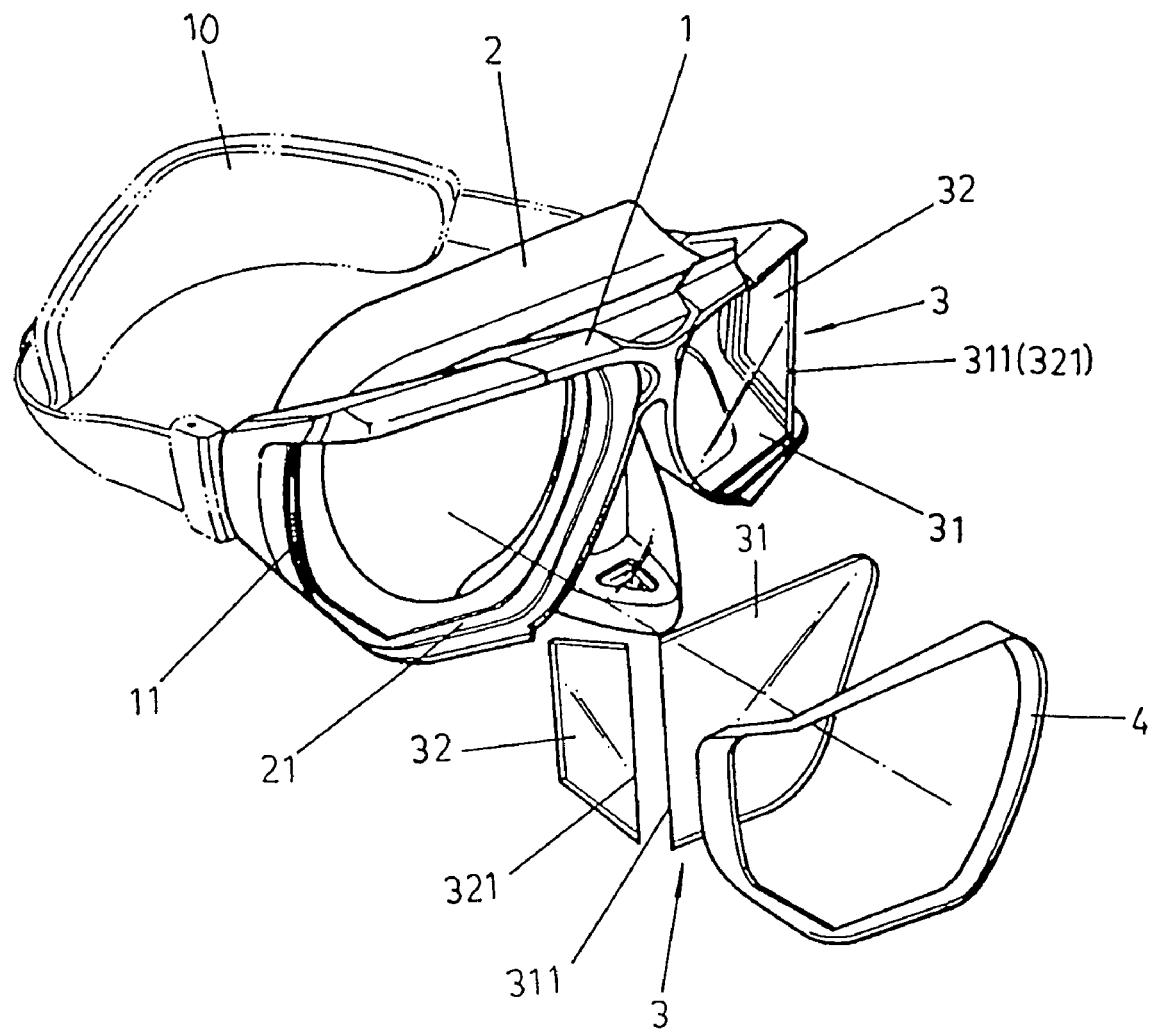
FIG. 2 shows an exploded view of the present invention.

Referring to FIGS. 1 and 2, the present invention is a panoramic-view diving mask comprising a hard plastic frame body 1, a soft silicone skirt 2, a head strap 10, two lens assembly 3, and two lens assembly rings 4, wherein a soft silicone skirt 2 is located inside the frame body 1, a frontal lens 31 and a side lens 32 of dual-window lens assembly 3 is located inside the lens frame opening 21, and the lens assembly ring 4 is located around each lens assembly 3.

The lens assembly 3 is formed by assembling the frontal lens 31 to the side lens 32 while a layer of elastic gasket medium A is attached or applied to either one or both surfaces of contacting edges 311 and 321 of the frontal lens 31 and side lens 32, respectively. The side lens 32 is then inlaid into the frame groove 11, which can be molded-in or an assembled body, formed on the inner side of the lens frame opening 21. The frontal lens 31 is places on the front side of the lens frame opening 21 to allow the contacting edge 311 of the frontal lens 31 to come in contact with the contacting edge 321 of the side lens 32. The lens assembly ring 4 is pressed against the frontal lens 31 and side lens 32 simultaneously to force the contacting edges of 311 and 321 to press tightly together meanwhile compressing the elastic gasket medium to create a watertight seal of this non-glued and removable self-sealing lens assembly of a panoramic-view diving mask.

Referring to FIGS. 3A to 3C, a non-glued, water-tight and removable self-sealing lens assembly 3 can be achieved by applying or attaching a layer of elastic gasket medium A to either one or both surfaces of the contacting edges 311 and 321 of the front lens 31 and the side lens 32, respectively.

Figure 4:
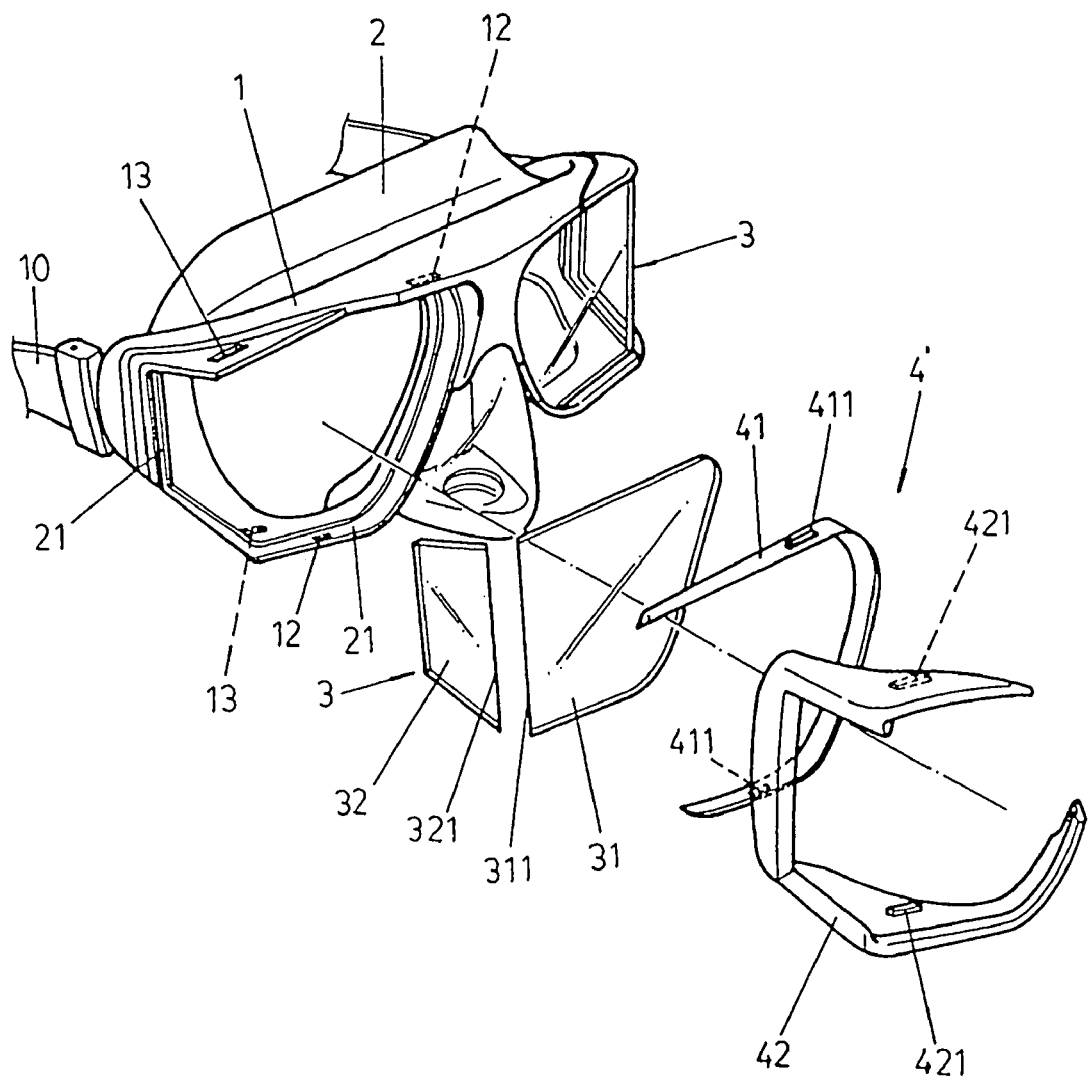
FIG. 4 shows an exploded view of the present invention.

Referring to FIG. 4, the lens assembly ring 4' comprises a front partial ring 41 and side partial ring 42, upon which protruding tabs 411 and 421 are respectively located. The dual-window lens assembly 3 comprises the frontal lens 31 and the side lens 32 with a layer of elastic gasket medium A applied to or attached to either one or both surfaces of the contacting edges 311 and 321 of the frontal lens 31 and side lens 32, respectively. The side lens 32 is places into the lateral side of the lens frame opening 21 then the side partial ring 42 presses against the side lens 32 while engaging the protruding tab 421 of the side partial ring 42 to both slots 13 located on the surface of the upper and lower section of the mask frame body 1, thereby stationing side lens 32 in the lens frame opening 21. The frontal lens 31 is then placed into the front side of the lens frame opening 21 and is pressed against by the front partial ring 41 while inserting the protruding tab 411 of the front partial ring 41 into both slots 12 located on the inner surface of the upper and lower section of the mask frame body 1, to force the contacting edges of 311 and 321 to press tightly together meanwhile compressing the elastic gasket medium in between to create a watertight seal of this non-glued, removable self-sealing lens assembly of a panoramic-view diving mask.

Figure 5:
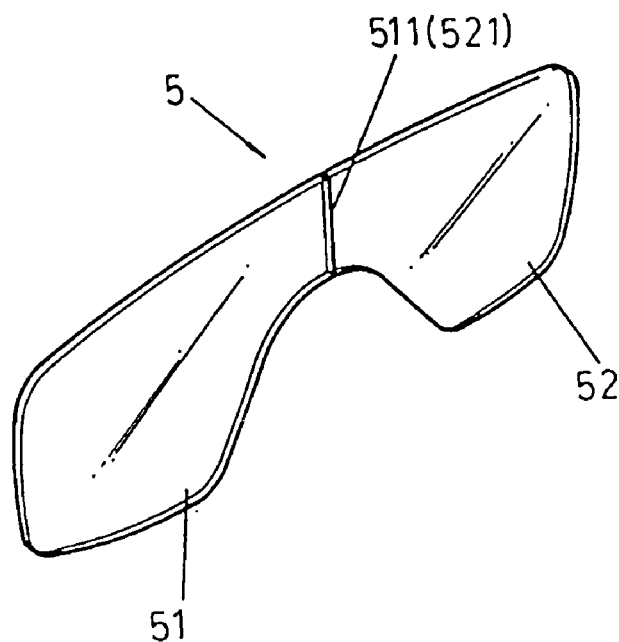
FIG. 5 shows a perspective view of a single-window mask of the present invention.
Figure 6:
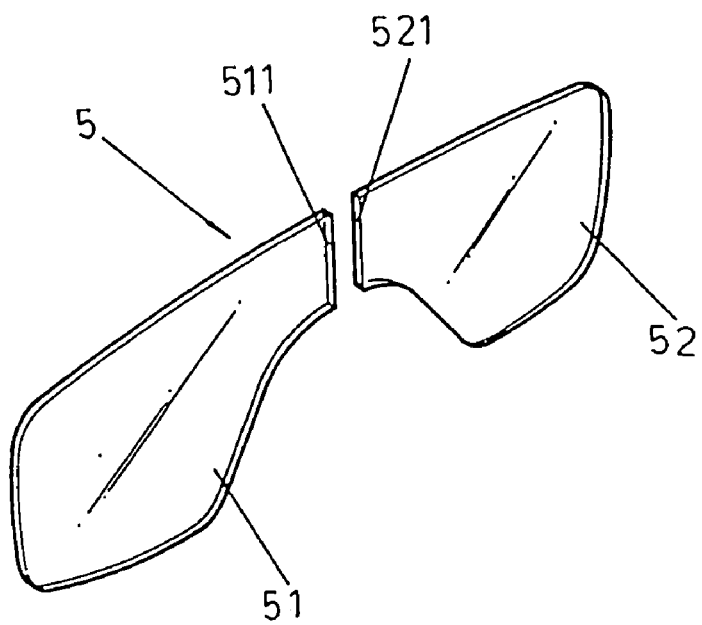
FIG. 6 shows an exploded view of the single-window mask of the present invention.

Referring to FIGS. 5 and 6, the present invention applies to the diving mask having a single-window lens assembly 5. A self sealing water-tight, single-window lens assembly 5 is assembled with the left-half lens 51 and the right-half lens 52 having a layer of elastic gasket medium B attached to or applied to one or both surfaces of the contacting edges 511 and 521 of the left-half lens 51 and right-half lens 52, respectively. With the non-glued, yet watertight and removable self-sealing lens assembly 5 described herein, individual users can easily replace a lens that is broken, scratched or corrected for near- or far-sighted vision.

Figure 7:
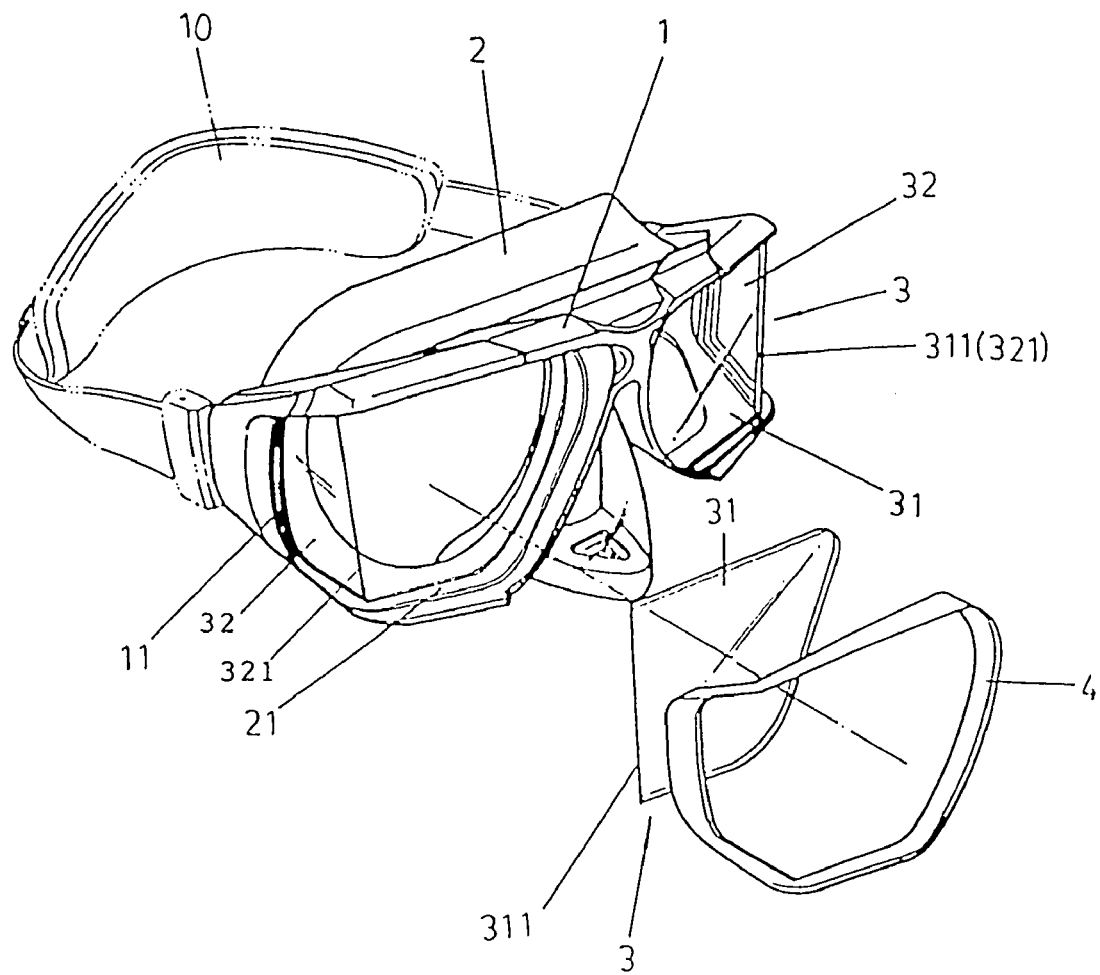
FIG. 7 shows an exploded view of the present invention.
Figure 8:
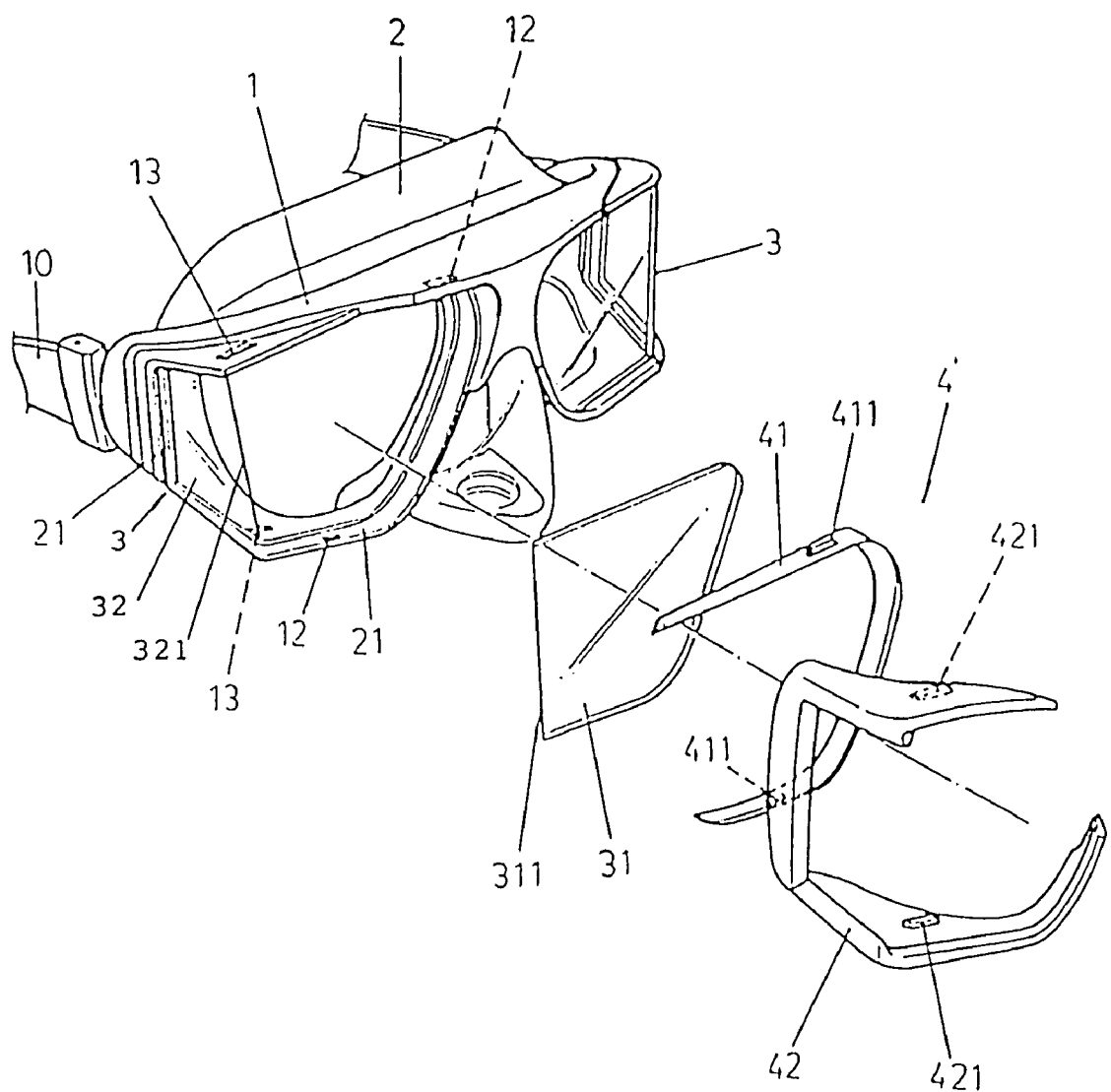
FIG. 8 shows an exploded view of the present invention.

FIGS. 7 and 8 refer to another preferred embodiment of the invention, in which the lens assembly 3 comprises a removable front lens 31 and a non-removable side lens 32. In this embodiment, lens assembly 3 is formed by assembling the frontal lens 31 to the side lens 32. Side lens 32 is integrally formed with frame body 1. For example, side lens 32 can be molded as part of frame body 1 or can be permanently bonded to frame body 1. A layer of elastic gasket medium A is attached or applied to either one or both surfaces of contacting edges 311 and 321 of the frontal lens 31 and side lens 32, respectively. The contacting edges 311 and 321 are beveled, with contacting edge 311 of frontal lens 31 capable of mating with contacting edge 321 of side lens 32.

The frontal lens 31 is placed on the front side of the lens frame opening 21 to allow the contacting edge 311 of frontal lens 31 to come in contact with contacting edge 321 of side lens 32. The lens assembly ring 4 is pressed against frontal lens 31 and side lens 32 to force contacting edges of 311 and 321 to press tightly together, compressing the elastic gasket medium to create a watertight seal of this non-glued and removable self-sealing lens assembly of a panoramic-view diving mask.

Figure 9:
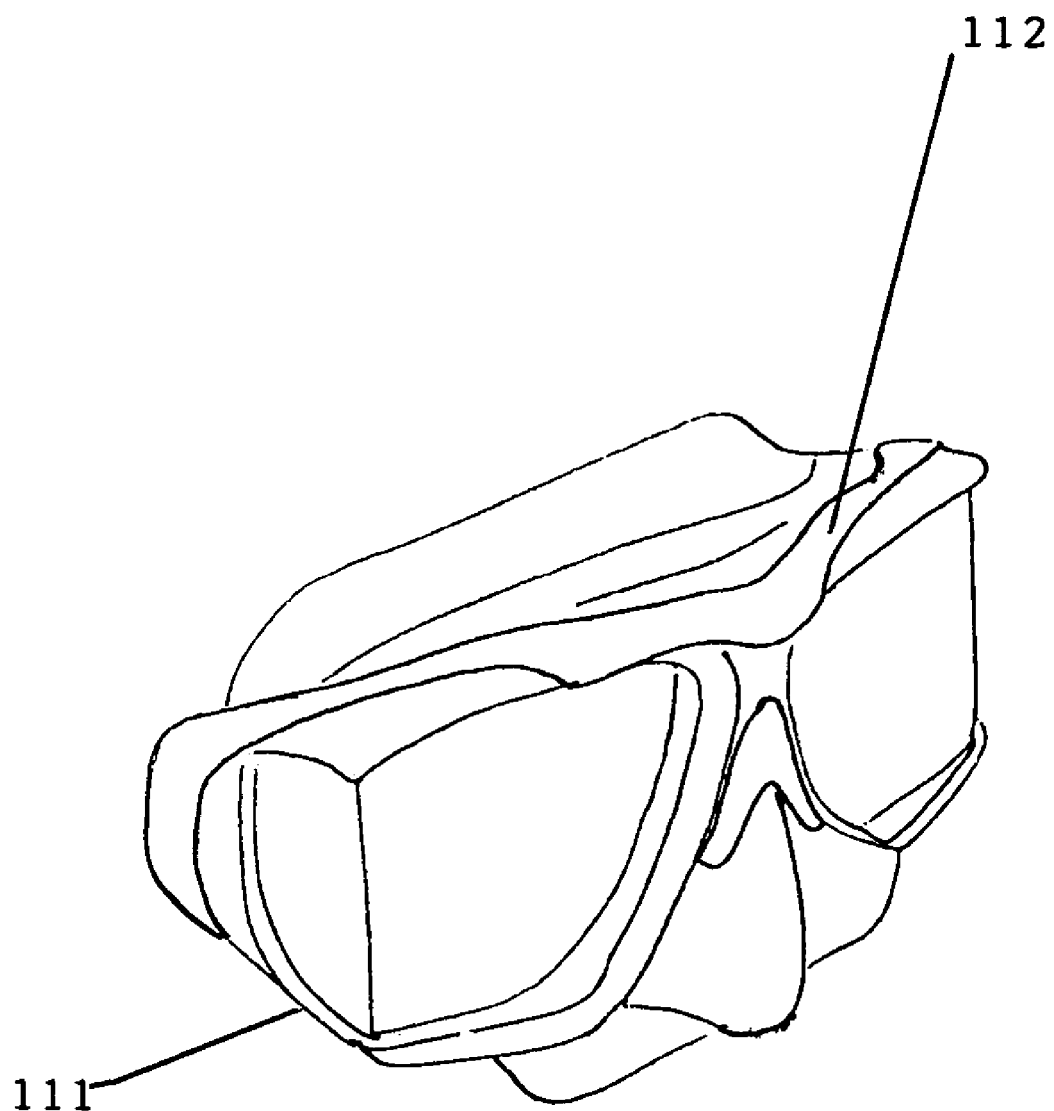
FIG. 9 shows a perspective view of the subframe and mainframe of the present invention.

Referring to FIG. 9, the frame body can be comprised of a subframe 111 fitted with a mainframe 112. In this embodiment, side lens 32 is integrally formed with subframe 111. For example, side lens 32 can be molded as part of subframe 111 or can be permanently bonded to subframe 111.

The embodiments described herein clearly demonstrate the improved method of the lens assembly for a panoramic-view diving mask without the application of adhesive to the lenses and having an enhanced seal. This non-glued, watertight and removable self-sealing lens assembly structure will allow the retrofitting of, or replacement of, lenses that are broken or scratched, or needing vision correction, without affecting the watertight integrity of the lens assembly. Moreover, the benefit to productivity and lowering of manufacturing costs can be clearly seen. Various modifications of this invention may be contemplated and can be resorted to without departing from the spirit and scope of this invention as defined by the following claims.

I claim:

1. A panoramic-view diving mask comprising:
    a frame body having a frame groove;
    at least one lens assembly including:
        at least one frontal lens with at least one contacting edge;
        at least one side lens with at least one contacting edge;
        said side lens formed integrally with said frame body;
        a layer of elastic gasket medium capable of being applied or attached to at least one contacting edge of said frontal lens or said side lens;

said contacting edge of said frontal lens capable of mating with said contacting edge of said side lens;

at least one lens assembly ring located on at least one said frontal lens and at least one said side lens whereby said frame body forcing said contacting edge of said frontal lens to press tightly against said contacting edge of said side lens in order to compress said layer of elastic gasket medium to create a water-tight seal;

wherein said lens assembly ring also comprising at least one front partial lens ring having protruding tabs for engaging built-in slots on said frame body in order to securely station said frontal lens.

2. A panoramic-view diving mask according to claim 1, wherein said means for applying or attaching said layer of elastic gasket medium to said contacting edges of said frontal lens and said side lens comprising:

a layer of elastic gasket medium printed, laminated, coated or painted on said contacting edges of said frontal lens and said side lens; or a layer of elastic gasket medium that can be inserted in between said contacting edges of said frontal lens and said side lens.

3. A panoramic-view diving mask according to claim 2, wherein said means for applying or attaching said layer of elastic gasket medium to said contacting edges of said frontal lens and said side lens further comprising:

said layer of elastic gasket medium applied or attached to both contacting edges of said frontal lens and said side lens; or said layer of elastic gasket medium applied or attached to said contacting edge of said frontal lens; or said layer of elastic gasket medium applied or attached to said contacting edge of said side lens.

4. A panoramic-view diving mask according to claim 1, wherein said frame body comprises a molded-in frame groove.

5. A panoramic-view diving mask according to claim 4, wherein said frame groove can be assembled onto the body of the mask.

6. A panoramic-view diving mask according to claim 1, wherein said lens assembly further comprising:

at least one left lens with a contacting edge and at least one right lens with a contacting edge;

a layer of elastic gasket medium applied to or attached to at least one said contacting edge of said left lens or said right lens; or a layer of elastic gasket medium applied to or attached to both contacting edges of said left lens and said right lens;

said left lens mating with said right lens along the contacting edges.

7. A panoramic-view diving mask comprising:

a frame body having a frame groove;

said frame body including a mainframe, said mainframe connected to a sub frame;

at least one lens assembly including:

at least one frontal lens with at least one contacting edge;

at least one side lens with at least one contacting edge;

said side lens formed integrally with said subframe;

a layer of elastic gasket medium capable of being applied or attached to at least one contacting edge of said frontal lens or said side lens;

said contacting edge of said frontal lens capable of mating with said contacting edge of said side lens;

at least one lens assembly ring located on at least one said frontal lens and at least one said side lens whereby said frame body forcing said contacting edge of said frontal lens to press tightly against said contacting edge of said side lens in order to compress said layer of elastic gasket medium to create a water-tight seal;

wherein said lens assembly ring also comprising at least one front partial lens ring having protruding tabs for engaging built-in slots on said frame body in order to securely station said frontal lens.

* * * * *